US010509652B2

(12) United States Patent
Sperber et al.

(10) Patent No.: US 10,509,652 B2
(45) Date of Patent: *Dec. 17, 2019

(54) IN-LANE VECTOR SHUFFLE INSTRUCTIONS

(71) Applicant: Intel Corporation, Santa Clara, CA (US)

(72) Inventors: Zeev Sperber, Zichron Yackov (IL); Robert Valentine, Kiryat Tivon (IL); Benny Eitan, Haifa (IL); Doron Orenstein, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,711

(22) Filed: Dec. 21, 2017

(65) Prior Publication Data

US 2018/0113711 A1    Apr. 26, 2018

Related U.S. Application Data

(63) Continuation of application No. 15/613,809, filed on Jun. 5, 2017, which is a continuation of application
(Continued)

(51) Int. Cl.
*G06F 9/30*      (2018.01)
*G06F 9/38*      (2018.01)
*G06F 9/315*     (2018.01)

(52) U.S. Cl.
CPC ...... *G06F 9/30032* (2013.01); *G06F 9/30036* (2013.01); *G06F 9/30109* (2013.01); *G06F 9/3887* (2013.01)

(58) Field of Classification Search
CPC . G06F 9/30032; G06F 9/30063; G06F 9/3887
See application file for complete search history.

(56) References Cited

U.S. PATENT DOCUMENTS 3,711,692 A   1/1973   Batcher
3,723,715 A   3/1973   Chen et al.
(Continued)

FOREIGN PATENT DOCUMENTS

WO   1997/07450 A1   2/1997
WO   1997/09671 A1   3/1997
WO   1997/32278 A1   9/1997

OTHER PUBLICATIONS

Final Office Action received for U.S. Appl. No. 11/967,211, dated Jun. 28, 2010, 22 pages.
(Continued)

*Primary Examiner* — Keith E Vicary
(74) *Attorney, Agent, or Firm* — NDWE, LLP

(57) ABSTRACT

In-lane vector shuffle operations are described. In one embodiment a shuffle instruction specifies a field of per-lane control bits, a source operand and a destination operand, these operands having corresponding lanes, each lane divided into corresponding portions of multiple data elements. Sets of data elements are selected from corresponding portions of every lane of the source operand according to per-lane control bits. Elements of these sets are copied to specified fields in corresponding portions of every lane of the destination operand. Another embodiment of the shuffle instruction also specifies a second source operand, all operands having corresponding lanes divided into multiple data elements. A set selected according to per-lane control bits contains data elements from every lane portion of a first source operand and data elements from every corresponding lane portion of the second source operand. Set elements are copied to specified fields in every lane of the destination operand.

27 Claims, 12 Drawing Sheets

Related U.S. Application Data

No. 13/838,048, filed on Mar. 15, 2013, now Pat. No. 9,672,034, which is a continuation of application No. 13/219,418, filed on Aug. 26, 2011, now Pat. No. 8,914,613, which is a continuation of application No. 11/967,211, filed on Dec. 30, 2007, now Pat. No. 8,078,836.

(56) References Cited

U.S. PATENT DOCUMENTS

| | | |
|---|---|---|
| 4,139,899 A | 2/1979 | Tulpule et al. |
| 4,161,784 A | 7/1979 | Cushing et al. |
| 4,393,468 A | 7/1983 | New |
| 4,418,383 A | 11/1983 | Doyle et al. |
| 4,490,786 A | 12/1984 | Nakatani |
| 4,498,177 A | 2/1985 | Larson |
| 4,707,800 A | 11/1987 | Montrone et al. |
| 4,771,379 A | 9/1988 | Ando et al. |
| 4,903,228 A | 2/1990 | Gregoire et al. |
| 4,989,168 A | 1/1991 | Kuroda et al. |
| 5,019,968 A | 5/1991 | Wang et al. |
| 5,081,698 A | 1/1992 | Kohn |
| 5,095,457 A | 3/1992 | Jeong |
| 5,168,571 A | 12/1992 | Hoover et al. |
| 5,187,679 A | 2/1993 | Vassiliadis et al. |
| 5,268,995 A | 12/1993 | Diefendorff et al. |
| 5,321,801 A | 6/1994 | Ando |
| 5,321,810 A | 6/1994 | Case et al. |
| 5,390,135 A | 2/1995 | Lee et al. |
| 5,408,670 A | 4/1995 | Davies |
| 5,423,010 A | 6/1995 | Mizukami |
| 5,426,783 A | 6/1995 | Norrie et al. |
| 5,465,374 A | 11/1995 | Dinkjian et al. |
| 5,487,159 A | 1/1996 | Byers et al. |
| 5,497,497 A | 3/1996 | Miller et al. |
| 5,524,256 A | 6/1996 | Turkowski |
| 5,579,253 A | 11/1996 | Lee et al. |
| 5,594,437 A | 1/1997 | O'Malley |
| 5,625,374 A | 4/1997 | Turkowski |
| 5,680,161 A | 10/1997 | Lehman et al. |
| 5,729,724 A | 3/1998 | Sharangpani et al. |
| 5,781,457 A | 7/1998 | Cohen et al. |
| 5,802,336 A | 9/1998 | Peleg et al. |
| 5,819,117 A | 10/1998 | Hansen |
| 5,822,619 A | 10/1998 | Sidwell |
| 5,838,984 A | 11/1998 | Nguyen et al. |
| 5,909,572 A | 6/1999 | Thayer et al. |
| 5,933,650 A | 8/1999 | van Hook et al. |
| 6,002,881 A | 12/1999 | York et al. |
| 6,041,404 A | 3/2000 | Roussel et al. |
| 6,115,812 A | 9/2000 | Abdallah et al. |
| 6,192,467 B1 | 2/2001 | Abdallah et al. |
| 6,223,277 B1 | 4/2001 | Karguth |
| 6,233,671 B1 | 5/2001 | Abdallah et al. |
| 6,233,681 B1 | 5/2001 | Kang |
| 6,266,758 B1 | 7/2001 | van Hook et al. |
| 6,288,723 B1 | 9/2001 | Huff et al. |
| 6,381,690 B1 | 4/2002 | Lee |
| 6,484,255 B1 | 11/2002 | Dulong |
| 6,546,480 B1 | 4/2003 | Mandavilli et al. |
| 6,947,558 B1 | 9/2005 | Graunke et al. |
| 6,957,321 B2 | 10/2005 | Sheaffer |
| 7,085,795 B2 | 8/2006 | Debes et al. |
| 7,133,040 B1 | 11/2006 | Abdallah et al. |
| 7,155,601 B2 | 12/2006 | Chennupaty et al. |
| 7,162,607 B2 | 1/2007 | Macy et al. |
| 7,190,787 B1 | 3/2007 | Graunke et al. |
| 7,213,131 B2 | 5/2007 | Hansen et al. |
| 7,272,622 B2 | 9/2007 | Sebot et al. |
| 7,343,389 B2 | 3/2008 | Macy et al. |
| 7,631,025 B2 | 12/2009 | Debes et al. |
| 7,647,557 B2 | 1/2010 | Janus |
| 7,685,212 B2 | 3/2010 | Sebot et al. |
| 7,725,521 B2 | 5/2010 | Chen et al. |
| 7,739,319 B2 | 6/2010 | Macy, Jr. et al. |
| 7,761,694 B2 | 7/2010 | Abdallah et al. |
| 8,078,836 B2 * | 12/2011 | Sperber ............... G06F 9/30032 712/22 |
| 8,914,613 B2 * | 12/2014 | Sperber ............... G06F 9/30032 712/22 |
| 9,672,034 B2 * | 6/2017 | Sperber ............... G06F 9/30032 |
| 2003/0123748 A1 | 7/2003 | Sebot et al. |
| 2004/0054877 A1 | 3/2004 | Macy, Jr. et al. |
| 2004/0054878 A1 | 3/2004 | Debes et al. |
| 2004/0054879 A1 | 3/2004 | Macy, Jr. et al. |
| 2004/0133617 A1 | 7/2004 | Chen et al. |
| 2005/0108312 A1 | 5/2005 | Chen et al. |
| 2006/0227966 A1 | 10/2006 | Knowles |
| 2007/0106882 A1 | 5/2007 | Thornton |
| 2010/0332794 A1 | 12/2010 | Hargil et al. |

OTHER PUBLICATIONS

Final Office Action received for U.S. Appl. No. 11/967,211, dated Nov. 22, 2010, 36 pages.

Non-Final Office Action received for U.S. Appl. No. 11/967,211, dated Feb. 23, 2010, 23 pages.

Non-Final Office Action received for U.S. Appl. No. 11/967,211, dated Nov. 2, 2010, 22 pages.

Notice of Allowance received for U.S. Appl. No. 11/967,211, dated May 16, 2011, 13 pages.

Final Office Action received for U.S. Appl. No. 13/219,418, dated Oct. 25, 2012, 12 pages.

Non-Final Office Action received for U.S. Appl. No. 13/219,418, dated Jun. 11, 2012, 13 pages.

Notice of Allowance received for U.S. Appl. No. 13/219,418, dated Aug. 8, 2014, 10 pages.

Final Office Action received for U.S. Appl. No. 13/838,048, dated Jun. 13, 2016, 15 pages.

Non-Final Office Action received for U.S. Appl. No. 13/838,048, dated Sep. 17, 2015, 14 pages.

Notice of Allowance received for U.S. Appl. No. 13/838,048, dated Feb. 2, 2017, 10 pages.

Austrian Search Report received for Austrian Patent Application No. 9901342-7, dated Oct. 31, 2000, 7 pages.

Abbott, et al., "Broadband Algorithms with the MicroUnity Mediaprocessor", IEEE, Proceedings of Compcon, 1996, pp. 349-354.

AMD, "AMD-3D Technology Manual", Feb. 1998, 68 pages.

Case, Brian, "Philips Hopes to Displace DSPs with VLIW", TriMedia Processors Aimed at Future Multimedia Embedded Apps, Microprocessor Report, Dec. 1994, pp. 12-17.

Diefendorff, et al., "AltiVec Extension to PowerPC Accelerates Media Processing", IEEE, 2000 pp. 85-95.

European Search Report received for European Patent Application No. 99302378.7, dated Mar. 14, 2000, 3 pages.

Gwennap, Linley, "New PA-RISC Processor Decodes MPEG Video", HP's PA-7100LC Uses New Instructions to Eliminate Decoder Chip, Jan. 1994, pp. 16-17.

Hansen, Craig, "Architecture of a Broadband Mediaprocessor", IEEE, Proceedings of Compcon, 1996, pp. 334-340.

Hayes, et al., "MicroUnity Software Development Environment", IEEE, Proceedings of Compcon, 1996, pp. 341-348.

Hewlett Packard, "64-bit and Multimedia Extensions in the PA-RISC 2.0 Architecture", Microprocessors Precision Architecture, 1997, 18 pages.

Intel, "i860TM Microprocessor Family Programmer's Reference Manual", 1992, 110 pages.

Intel, "IA-32 Intel Architecture Software Developer's Manual", vol. 1: Basic Architecture, Order No. 245470-005, 2002, 61 pages.

Intel, "IA-32 Intel Architecture Software Developer's Manual", vol. 2: Instruction Set Reference, Order No. 245471-005, 2002, 19 pages.

Intel, "Intel Architecture Software Developer's Manual", vol. 2: Instruction Set Reference, Order No. 243191, 1999, 27 pages.

Intel, "Intel Itanium Architecture Software Developer's Manual", vol. 3: Instruction Set Reference, Revision 2.0, Dec. 2001, 30 pages.

(56) References Cited

OTHER PUBLICATIONS

Intel, "Intel486 Microprocessor Family Programmer's Reference Manual", 1992, 44 pages.
Intel, "Pentium Processor User's Manual", vol. 3: Architecture and Programming Manual, 1993, 50 pages.
Intel, "Williamette Processor Software Developer's Guide", Order No. 245355-001, Feb. 2000, 16 pages.
Kawakami, et al., "A Single-Chip Digital Signal Processor for Voiceband Applications", IEEE, International Solid-State Circuits Conference, 1980, pp. 40-41.
Lee, Ruby B., "Accelerating Multimedia with Enhanced Microprocessors", IEEE Micro, 1995, pp. 22-32.
Levinthal, et al., "Chap—A SIMD Graphics Processor", Computer Graphics Project, ACM, vol. 18, No. 3, Jul. 1984, pp. 77-82.
Levinthal, et al., "Parallel Computers for Graphics Applications", "Proceedings: Second International Conference on Architectural Support for Programming Languages and Operating Systems, (ASPLOS II), IEEE, 1987, pp. 193-198."
Margulis, Neal, "i860 Microprocessor Architecture", Intel, 1990, 170 pages.
Motorola, "Errata to MC88110 Second Generation RISC Microprocessor User's Manual", 1992, 6 pages.
Motorola, "MC88110 Programmer's Reference Guide", Motorola Semiconductor Technical Data, Rev. 1 1992, 5 pages.
Motorola, "MC88110 Second Generation RISC Microprocessor User's Manual", 1991, 616 pages.
Shipnes, Julie, "Graphics Processing with the 88110 RISC Microprocessor", IEEE, 1992, pp. 169-174.
Sun Microsystems, "Ultrasparc the Visual Instruction Set: On Chip Support for New-Media Processing", Whitepaper 95-022,1997, 7 pages.
TMS320C2x, "User's Guide", Digital Signal Processing Products, 1993, pp. 3-2-3-11; 3-28-3-34; 4-1-4-22; 4-41; 4-103; 4-119; 4-120; 4-122, 4-150-4-151.
Tri-Media, "TM1000 Preliminary Data Book", Phillips Electronics North American Corporation, 1997, 30 pages.
UltraSPARC, "UltraSPARC Multimedia Capabilities On-Chip Support for Real-Time Video and Advanced Graphics", SPARC Technology Business, Sep. 1994, 8 pages.
Wang, Yulun, et al., "A Processor Architecture for 3D Graphics Calculations", Computer Motion, Inc., 1992, pp. 1-23.
Intel, "Pentium Processor Family Developer's Manual", vol. 3: Architecture and Programming Manual, 1995, 54 pages.
MIPS, "MIPS Extension for Digital Media With 3D", MIPS Technologies, Inc., Mar. 12, 1997, 29 pages.
Gwennap, Linley, "Digital, MIPS Add Multimedia Extensions", Digital Focuses on Video, MIPS on 3D Graphics; Vendors Debate Differences, Microdesign Resources, vol. 10, No. 15, Nov. 18, 1996, 5 pages.
MIPS.com "MIPS Digital Media Extension," Set Architecture Specification, Web Site—mips.com/MDMXspec.ps, Rev. 1.0, Oct. 21, 1997, 40 pages.
Non-Final Office Action from U.S. Appl. No. 15/801,652, dated Feb. 37, 2019, 47 pages.
Non-Final Office Action from U.S. Appl. No. 15/849,710, dated Feb. 37, 2019, 47 pages.
Non-Final Office Action from U.S. Appl. No. 15/849,715, dated Jan. 10, 2019, 29 pages.
Non-Final Office Action from U.S. Appl. No. 15/613,809 dated Jan. 24, 2019, 45 pages.

* cited by examiner

IN-LANE VECTOR SHUFFLE INSTRUCTIONS

CROSS REFERENCE TO RELATED APPLICATIONS

The present application is a continuation of U.S. patent application Ser. No. 15/613,809, filed on Jun. 5, 2017, titled "IN-LANE VECTOR SHUFFLE INSTRUCTIONS", which is a continuation of U.S. patent application Ser. No. 13/838, 048, filed on Mar. 15, 2013, now U.S. Pat. No. 9,672,034, issued on Jun. 6, 2017, which is a continuation of U.S. patent application Ser. No. 13/219,418, filed on Aug. 26, 2011, now U.S. Pat. No. 8,914,613, issued on Dec. 16, 2014, which is a continuation of U.S. patent application Ser. No. 11/967, 211, filed on Dec. 30, 2007, now U.S. Pat. No. 8,078,836, issued on Dec. 13, 2011. U.S. patent application Ser. No. 11/967,211 is hereby incorporated herein by this reference in its entirety and for all purposes.

FIELD OF THE INVENTION

The invention relates to computer systems, and in particular, to an apparatus and method for performing multi-dimensional computations using an in-lane shuffle operation.

BACKGROUND

A Single Instruction, Multiple Data (SIMD) architecture improves efficiency of multi-dimensional computations. Implemented in computer systems, the SIMD architecture enables one instruction to operate on data simultaneously, rather than on a single data. In particular, SIMD architectures take advantage of packing many data elements within one register or memory location. With parallel hardware execution, multiple operations can be performed with one instruction, resulting in significant performance improvement.

Although many applications currently in use can take advantage of such operations, known as vertical operations, there are a number of important applications which require the rearrangement of the data elements before vertical operations can be implemented so as to provide realization of the application. Examples of some important applications include the dot product and matrix multiplication operations, which are commonly used in 3-D graphics and signal processing applications.

One problem with rearranging the order of data elements within a register or memory word is the mechanism used to indicate how the data should be rearranged. Typically, a mask or control word is used. The control word must include enough bits to indicate which of the source data fields must be moved into each destination data field. For example, if a source operand has eight data fields, requiring three bits to designate any given data field, and the destination register has four data fields, (3×4) or 12 bits are required for the control word. However, on a processor implementation where there are less than 12 bits available for the control register, a full shuffle cannot be supported. Some approaches addressing such issues were presented, for example, in U.S. Pat. No. 6,041,404 and in U.S. Pat. No. 7,155,601.

The problem described above is made worse though, when even more data fields are permitted in the sources and destinations. Moreover the complexity of circuitry required to shuffle data and to control said shuffling can increase proportional to the square of the number of permitted data fields causing undesirable delays, costing precious die area, and consuming ever more power. Therefore, there is a need for a way to reorganize the order of data elements where less than the full number of bits is available for a control register in such a way as to scale to handle operands where even more data fields are permitted.

BRIEF DESCRIPTION OF THE DRAWINGS

The invention will be described in detail with reference to the following drawings in which like reference numerals refer to like elements wherein.

DETAILED DESCRIPTION

In-lane vector shuffle operations are described herein. In embodiments of a shuffle operation, sets of data elements are selected from corresponding portions of each lane of a source operand according to per-lane control bits and copied to specified fields in corresponding portions of each lane of a destination operand. Other embodiments of the shuffle instruction specify two source operands, all operands having corresponding lanes divided into multiple data elements. Data elements selected according to per-lane control bits include data elements from each lane portion of a first source operand and include data elements from each corresponding lane portion of a second source operand, which are copied to specified fields in corresponding lanes of the destination operand.

The shuffle instruction has useful applications in data reorganization and in moving data into different locations of the register to allow, for example, extra storage for scalar operations, manipulation of complex numbers that require transforms, or to facilitate conversion between data formats such as from packed integer to packed floating point and vice versa. Such application in the technical arts include but are not limited to motion video compression/decompression, image filtering, audio signal compression, filtering or synthesis, modulation/demodulation, etc. Data formats of certain particular data or signal types such as audio or motion video for example, which are representative of or constitute communication, physical activity or objects often have regular structures and component data elements which can be manipulated or transformed in substantially similar ways for each lane of a source operand. Thus shuffling data elements according to a field of per-lane control bits is applicable to such data or signal types.

In the following description, numerous specific details are set forth to provide a thorough understanding of the invention. However, it will be understood by one of ordinary skill in the art that the invention may be practiced without these specific details. In other instances, well-known circuits, structures and techniques have not been shown in detail in order not to obscure the invention.

Figure 1:
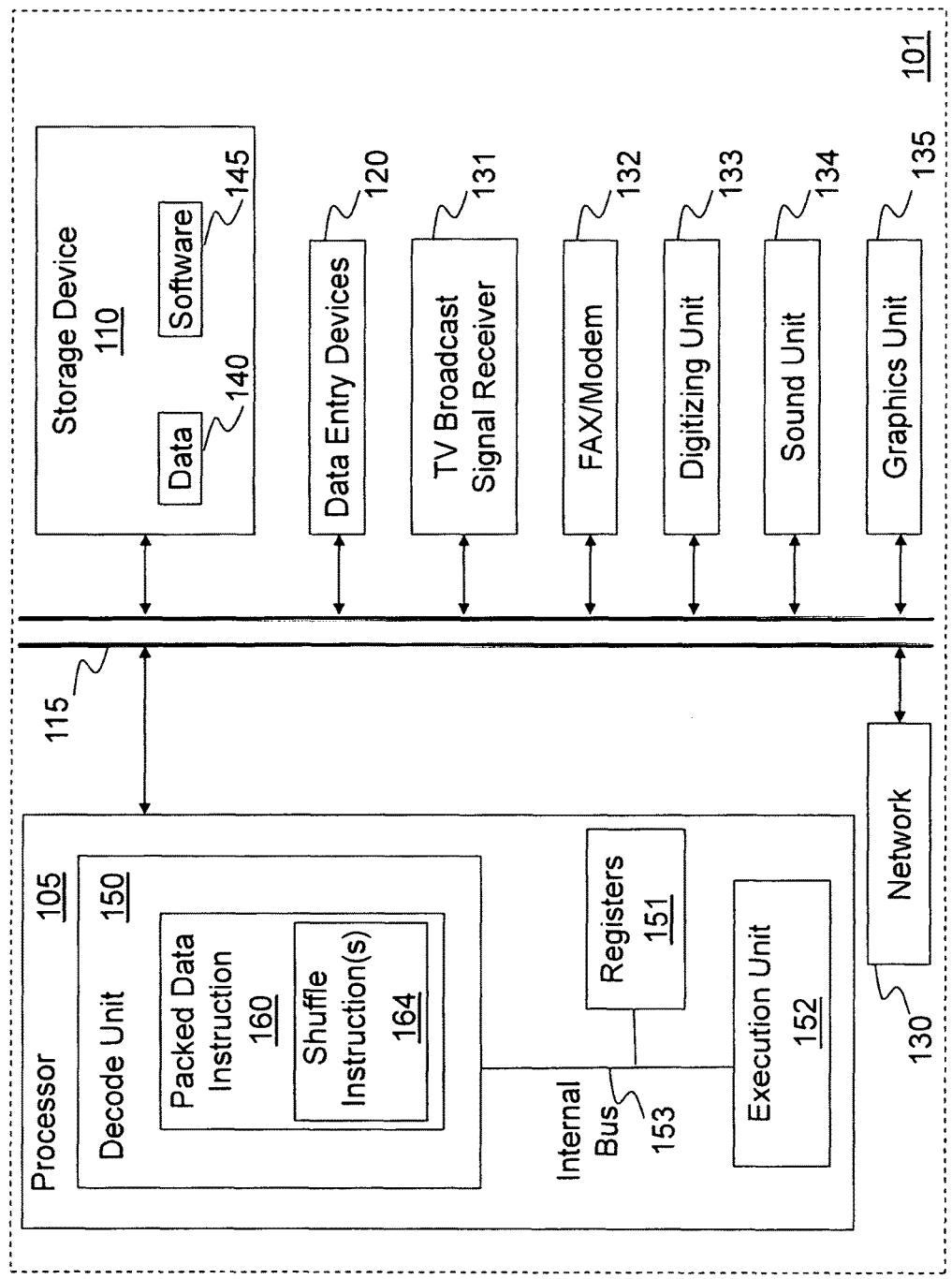
FIG. 1 illustrates an exemplary computer system in accordance with one embodiment of the invention.

FIG. 1 illustrates one of many embodiments of a computer system 101 which implements the principles of the present invention. Computer system 101 comprises a processor 105, a storage device 110, and a bus 115. The processor 105 is coupled to the storage device 110 by the bus 115. In addition, a number of user input/output devices 120, such as a keyboard, mouse and display, are also coupled to the bus 115.

The processor 105 represents a central processing unit of any type of architecture, such as Complex Instruction Set Computer (CISC), Reduced Instruction Set Computer (RISC), very long instruction word (VLIW), or a hybrid architecture (e.g., a combination of hardware and software translation). Also, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., Accelerated Graphics Port "AGP", Peripheral Component Interconnect "PCI", Industry Standard Architecture "ISA", Extended Industry Standard Architecture "EISA", Video Electronics Standard Architecture "VESA" and the like) and bridges (also termed as bus controllers). While this embodiment is described in relation to a single processor computer system, the invention could be implemented in a multi-processor computer system.

In addition, while embodiments of the invention are herein described in relation to 256-bit operands having 128-bit lanes, the invention is not limited to a computer system with 128-bit lanes or 256-bit operands. For example, lanes could be comprised of but not limited to having 64 bits, and operands could independently be comprised of but not limited to having 512 bits.

Furthermore, devices including but not limited to one or more of a network 130, a TV broadcast signal receiver 131, a fax/modem 132, a digitizing unit 133, a sound unit 134, and a graphics unit 135 may optionally be coupled to bus 115. The network 130 represents one or more network connections (e.g., an Ethernet connection). The TV broadcast signal receiver 131 represents a device for receiving TV broadcast signals, the fax/modem 132 represents a fax and/or modem for receiving and/or transmitting analog signals. The digitizing unit 133 represents one or more devices for digitizing images (e.g., a scanner, camera, etc.). The sound unit 134 represents one or more devices for inputting and/or outputting sound (e.g., sound card, microphones, speakers, magnetic storage devices, optical storage devices, etc.). The graphics unit 135 represents one or more devices for generating images (e.g., graphics card).

FIG. 1 also illustrates that the storage device 110 has stored therein data 140 and software 145. Data 140 represents data stored in one or more of the formats described herein. Software 145 represents the necessary code for performing any and/or all of the techniques in accordance with the present invention. It will be recognized by one of ordinary skill in the art that the storage device 110 may contain additional software (not shown), which is not necessary to understanding the invention.

FIG. 1 additionally illustrates that the processor 105 includes decode unit 150, a set of registers 151, execution unit 152, and an internal bus 153 for executing instructions. It will be recognized by one of ordinary skill in the art that the processor 105 contains additional circuitry, which is not necessary to understanding the invention. The decode unit 150, registers 151 and execution unit 152 are coupled together by internal bus 153. The decode unit 150 is used for decoding instructions received by processor 105 into control signals and/or microcode entry points. In response to these control signals and/or microcode entry points, the execution unit 152 performs the appropriate operations. The decode unit 150 may be implemented using any number of different mechanisms (e.g., a look-up table, a hardware implementation, a programmable logic array "PLA"). Any mechanism for logically performing decoding of the various instructions is considered to be within the scope of the implementation of the invention.

The decode unit 150 is shown including a packed data instruction set 160 for performing operations on packed data. In one possible embodiment, the packed data instruction set 160 includes the shuffle instruction(s) 164 for performing in-lane vector shuffle operations. The number format for the instructions can be any format including signed and unsigned integers, floating-point numbers, and non-numeric data. The operations of these shuffle instructions are briefly described below and in greater detail with regard to FIGS. 2a-2c, 3a-3b, 5a-5c and 6a-6b.

One embodiment includes shuffling packed data elements according to a single shuffle instruction 164 that specifies a field of per-lane control bits, a single source operand and a destination operand. The source and destination operands each have corresponding multi-bit lanes that may be divided into upper and lower portions, each including a similar number of data elements. According to the field of per-lane control bits, a substantially similar set of data elements can be selected from any data elements in corresponding portions of every multi-bit lane of the source operand. Then each data element of the selected set can be copied, according to the field of per-lane control bits, to any specified data fields located in corresponding portions of every multi-bit lane of the destination operand.

Alternatively, a single shuffle instruction 164 specifies the field of per-lane control bits, a first source operand, a second source operand, and a destination operand, all operands having corresponding multi-bit lanes, the corresponding multi-bit lanes having corresponding portions, each including a substantially similar number of data elements. Again, using a field of per-lane control bits, a set of data elements can be selected including data elements from every multi-bit lane portion of the first source operand and including data elements from every corresponding multi-bit lane portion of the second source operand. Each data element of the selected set can then be copied to specified locations in corresponding multi-bit lanes of the destination operand.

In addition to the packed data instructions, processor 105 can include new instructions and/or instructions similar to or the same as those found in existing general purpose processors. For example, in one embodiment, the processor 105 supports an instruction set which is compatible with the Intel® Architecture instruction set used in the Pentium® processors and/or Core™ processors.

It will be appreciated that as in some instructions of the Intel® Architecture instruction set and in some embodiments of shuffle instruction 164, a source operand and a destination operand as described herein may, in fact, be the same operand and source data may be overwritten by destination data in that operand. Alternative embodiments of the invention may contain more or less, as well as different, packed data instructions and still utilize the teachings of the invention.

The registers 151 represent a storage area on processor 105 for storing information, including control/status information, integer data, floating point data, and packed data. It will be understood by one of ordinary skill in the art that one aspect of the invention is the described instruction set for operating on packed data as well as how the instructions are used. According to these aspects of the invention, the storage area used for storing the packed data is not critical. The term data processing system is used herein to refer to any machine for processing data, including the computer systems(s) described with reference to FIG. 1.

Figure 5A:
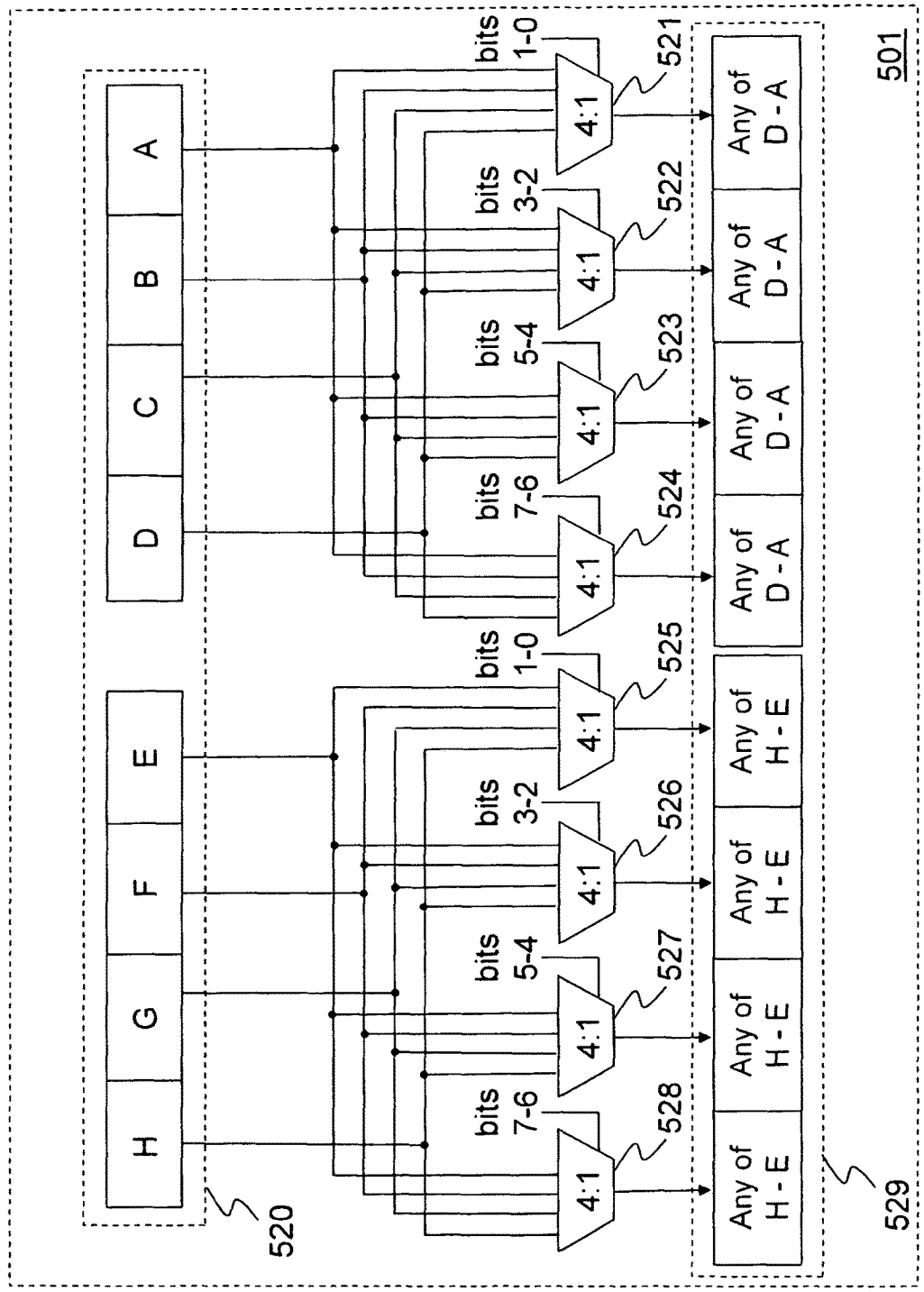
FIGS. 5a to 5c illustrate the operation of the shuffle instructions in accordance with embodiments of the invention.

While one embodiment of the invention is described below with regard to FIGS. 5b-5c, in which the processor 105, executing the packed data instructions operates on 256-bit packed data operands containing sixteen 16-bit packed data elements called "words," the processor 105 can operate on packed data in several different packed data formats. For example, in one embodiment, packed data can be operated on a "byte" format or a "double word" (dword) format. The packed byte format includes thirty-two separate 8-bit data elements and the packed dword format includes eight separate 32-bit data elements, for example as shown in FIG. 5a. While certain instructions are discussed below with reference to integer data, the instructions may be applied to other packed data formats as well. The 32-bit data elements shown in FIG. 5a or as shown in FIG. 6b may represent packed single-precision floating-point data, for example, and 64-bit data elements shown in FIG. 6a may be understood to represent packed double-precision floating-point data.

Figure 2A:
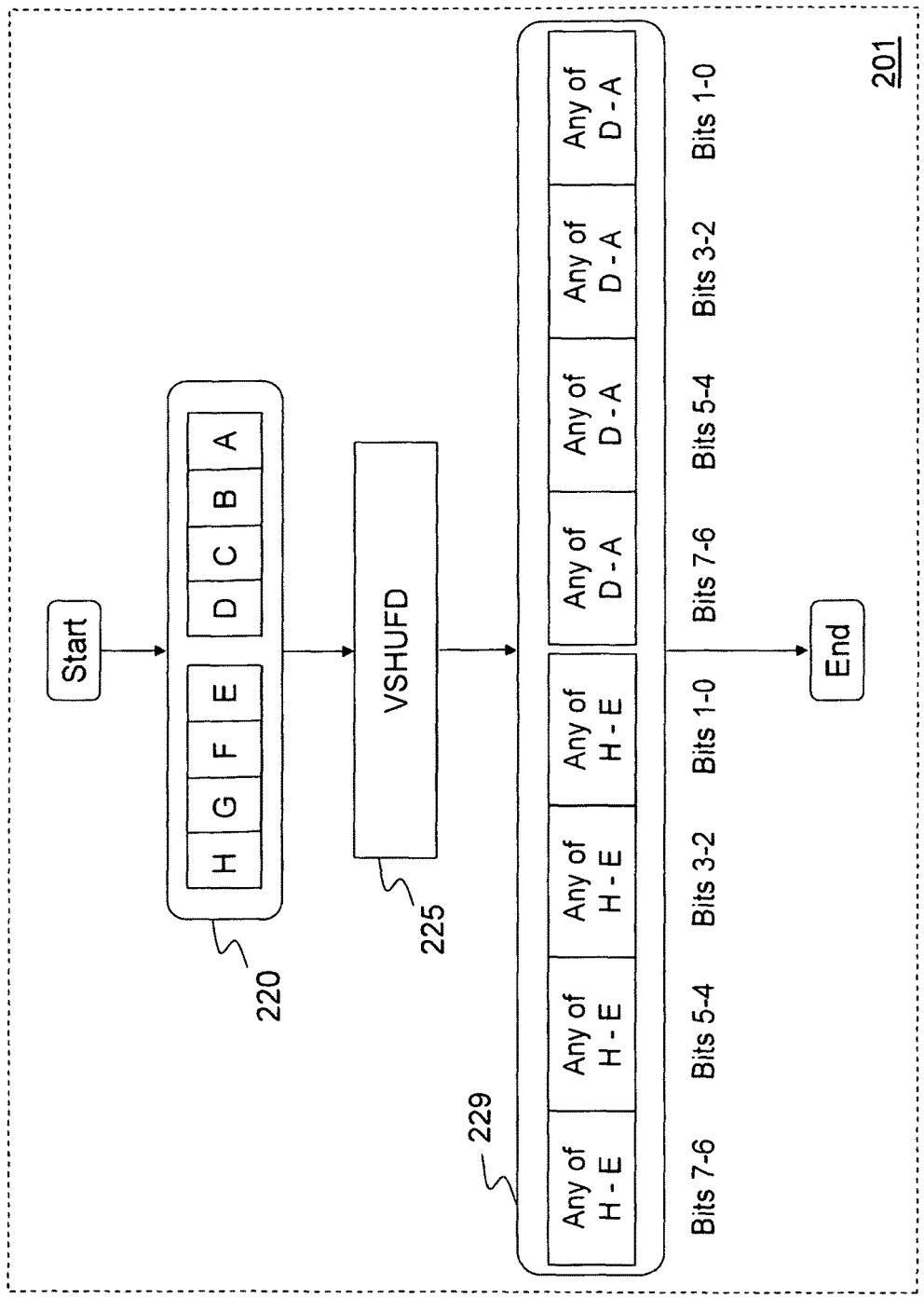
FIGS. 2a to 2c illustrate flow diagrams for processes to perform shuffle instructions according to a set of embodiments of the invention.

FIG. 2a illustrates a flow diagram for one embodiment of a process to perform a shuffle instruction 164 according to one embodiment of the invention. Process 201 and other processes herein disclosed are performed by processing blocks that may comprise dedicated hardware or software or firmware operation codes executable by general purpose machines or by special purpose machines or by a combination of both.

This embodiment includes shuffling packed data elements according to a single shuffle instruction 164 that specifies a field of per-lane control bits 7-0, a single source operand and a destination operand. The source operand is accessed in processing block 220. The source and destination operands each have corresponding multi-bit lanes. For one embodiment these multi-bit lanes are each 128-bit lanes each including a similar number of (e.g. in this case four) data elements. According to the field of per-lane control bits 7-0 and the VSHUFD shuffle instruction 164 of processing block 225, a substantially similar set of data elements is selected from any data elements D-A and from any data elements H-E in each 128-bit lane of the source operand. Then in processing block 229 each data element of the selected set is copied, according to the field of per-lane control bits 7-0, to any data fields located in corresponding portions of each 128-bit lane of the destination operand as specified according to the VSHUFD shuffle instruction 164.

Figure 2B:
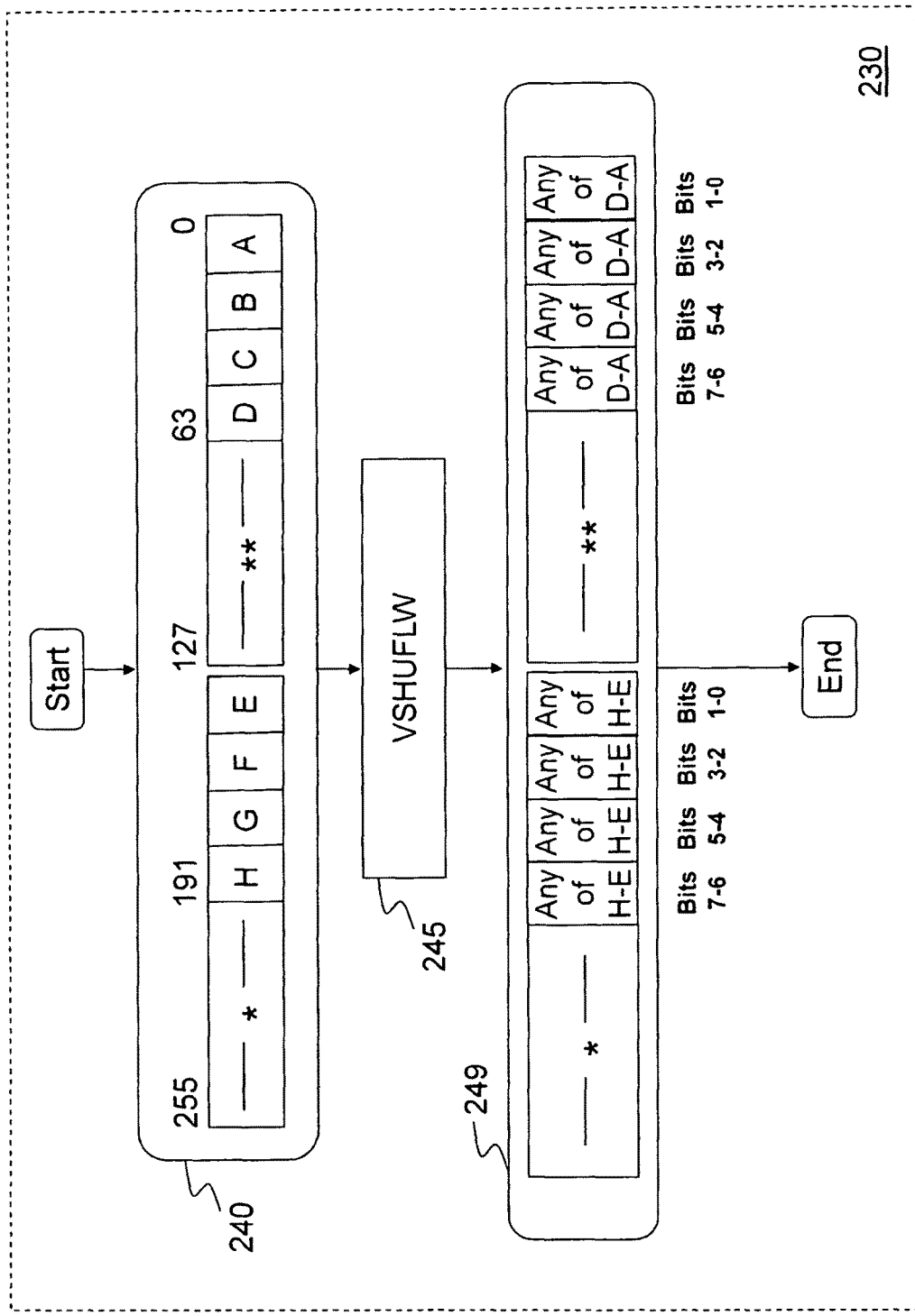

FIG. 2b illustrates a flow diagram for one embodiment of a process 202 to perform a shuffle instruction 164 according to an alternative embodiment of the invention. This embodiment includes shuffling packed data elements according to a single shuffle instruction 164 that again specifies a field of per-lane control bits 7-0, a single source operand and a destination operand. The source operand is accessed in processing block 240. The source and destination operands each have corresponding multi-bit lanes. For example, in this case these multi-bit lanes are each 128-bit lanes that may be divided into upper and lower portions, each including a similar number of (e.g. in this case four) data elements. According to the field of per-lane control bits 7-0 and the VSHUFLW shuffle instruction 164 of processing block 245, a substantially similar set of data elements is selected from any data elements D-A and from any data elements H-E in corresponding lower portions of each 128-bit lane of the source operand. Then in processing block 249 each data element of the selected set is copied, according to the field of per-lane control bits 7-0, to any data fields located in corresponding portions of each 128-bit lane of the destination operand as specified according to the VSHUFLW shuffle instruction 164. The higher portions of each 128-bit lane of the source operand (in this case bits 255-192 and bits 127-64) are copied to corresponding higher portions of each 128-bit lane of the destination operand.

Figure 2C:
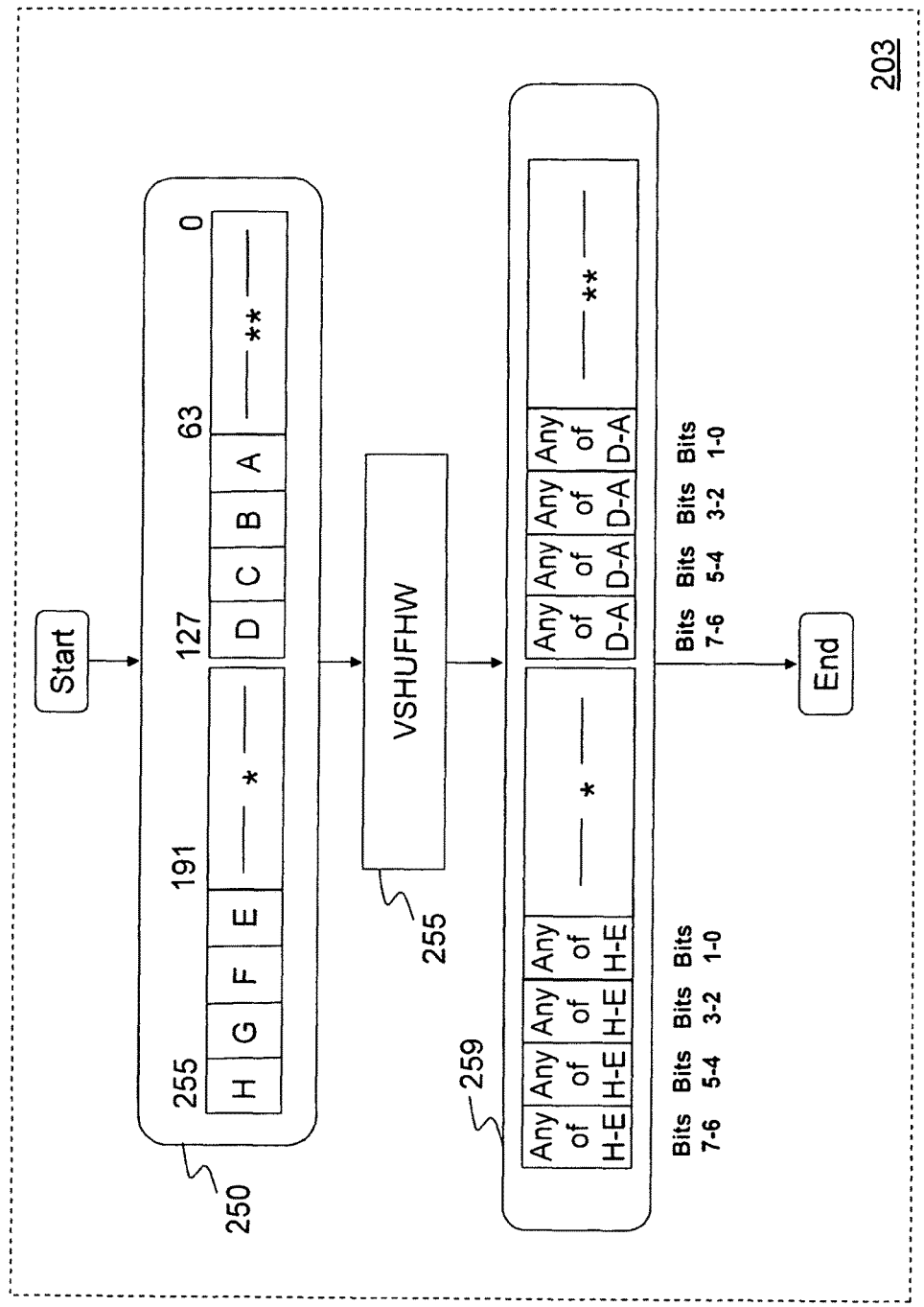

FIG. 2c illustrates a flow diagram for one embodiment of a process 203 to perform a shuffle instruction 164 according to another alternative embodiment of the invention. This embodiment includes shuffling packed data elements according to a single shuffle instruction 164 that also specifies a field of per-lane control bits 7-0, a single source operand and a destination operand. The source operand is accessed in processing block 250. Again the source and destination operands each have corresponding multi-bit lanes, which are both 128-bit lanes in this case, that may be divided into upper and lower portions, each including a similar number (e.g. four) of data elements. According to the field of per-lane control bits 7-0 and the VSHUFHW shuffle instruction 164 of processing block 255, a substantially similar set of data elements is selected from any data elements D-A and from any data elements H-E in corresponding higher portions of each 128-bit lane of the source operand. Then in processing block 259 each data element of the selected set is copied, according to the field of per-lane control bits 7-0, to any data fields located in corresponding portions of each 128-bit lane of the destination operand as specified according to the VSHUFHW shuffle instruction 164. The lower portions of each 128-bit lane of the source operand (in this case bits 191-128 and bits 63-0) are copied to corresponding lower portions of each 128-bit lane of the destination operand.

Figure 3A:
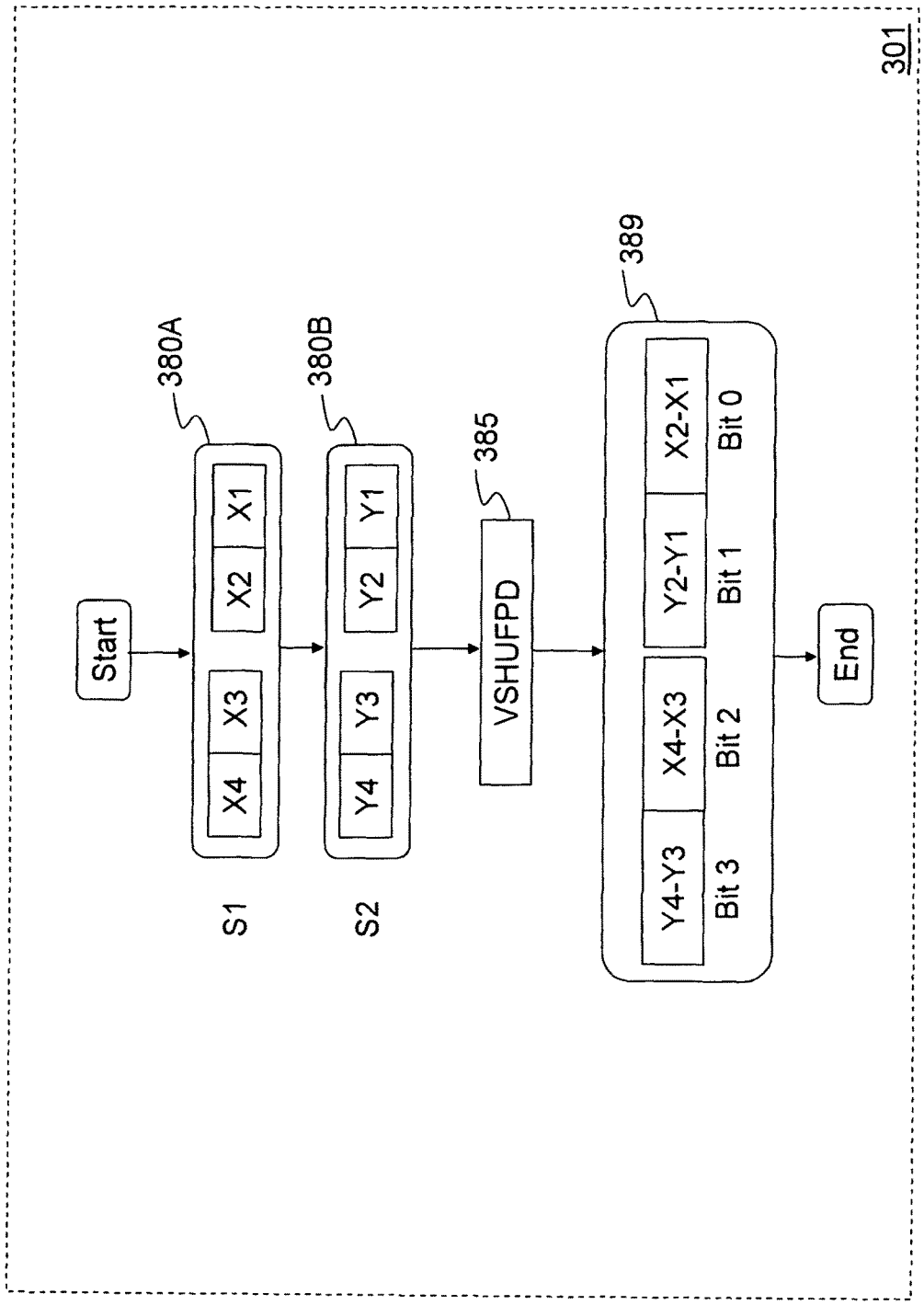
FIGS. 3a to 3b illustrate flow diagrams for processes to perform shuffle instructions according to a set of alternative embodiments of the invention.

FIG. 3a illustrates a flow diagram for one embodiment of a process 301 to perform a shuffle instruction 164 according to another alternative embodiment of the invention. This embodiment includes shuffling packed data elements according to a single shuffle instruction 164 that specifies a field of per-lane control bits 3-2 and bits 1-0, a first source operand, a second source operand, and a destination operand. The first source operand, S1, is accessed in processing block 380A. The second source operand, S2, is accessed in processing block 380B. All operands have corresponding multi-bit lanes, which are 128-bit lanes in this case, each multi-bit lane includes a substantially similar number (e.g. two) of data elements. According to the field of per-lane control bits 3-2, bits 1-0 and the VSHUFPD shuffle instruction 164 of processing block 385, a set of data elements can be selected including data elements (X1 or X2 and X3 or X4) from the 128-bit lanes of the first source operand and data elements (Y1 or Y2 and Y3 or Y4) from the 128-bit lanes of the second source operand. Then in processing block 389 each data element of the selected set is copied to locations in corresponding 128-bit lanes of the destination operand as specified according to the VSHUFPD shuffle instruction 164.

Figure 3B:
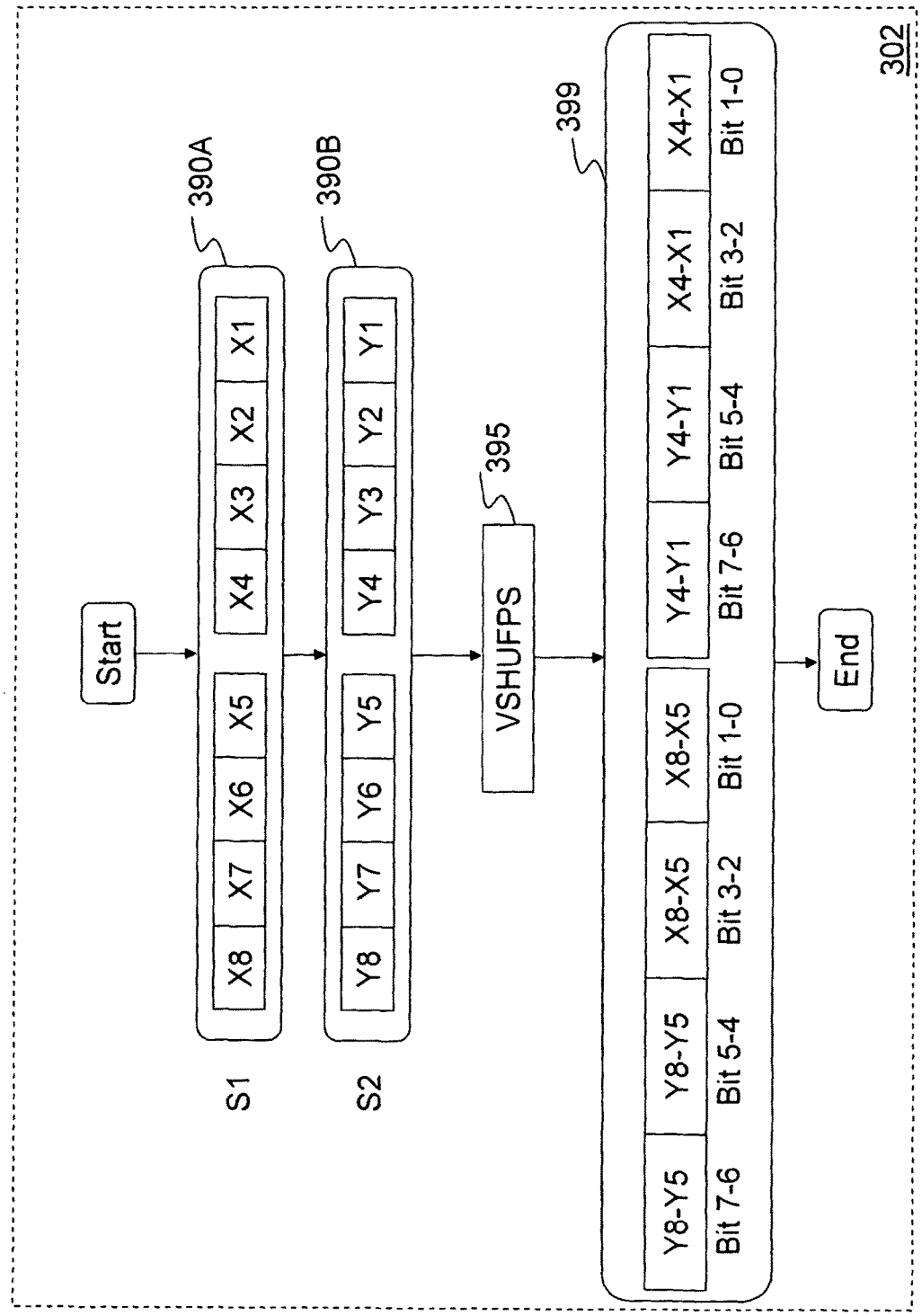

FIG. 3b illustrates a flow diagram for one embodiment of a process 302 to perform a shuffle instruction 164 according to another alternative embodiment of the invention. This embodiment includes shuffling packed data elements according to a single shuffle instruction 164 that specifies a field of per-lane control bits 7-0, a first source operand, a second source operand, and a destination operand. The first source operand, S1, is accessed in processing block 390A. The second source operand, S2, is accessed in processing block 390B. All operands have corresponding multi-bit lanes, which are 128-bit lanes in this case, each multi-bit lane includes a substantially similar number (e.g. four) of data elements. According to the single field of per-lane control bits 7-0 and the VSHUFPS shuffle instruction 164 of processing block 395, a set of data elements can be selected including corresponding data elements (X1-X4 or X5-X8) from every 128-bit lane of the first source operand and including corresponding data elements (Y1-Y4 or Y5-Y8) from every 128-bit lane of the second source operand. Then in processing block 399 each data element of the selected set is copied to locations in corresponding 128-bit lanes of the destination operand as specified according to the VSHUFPS shuffle instruction 164.

Figure 4:
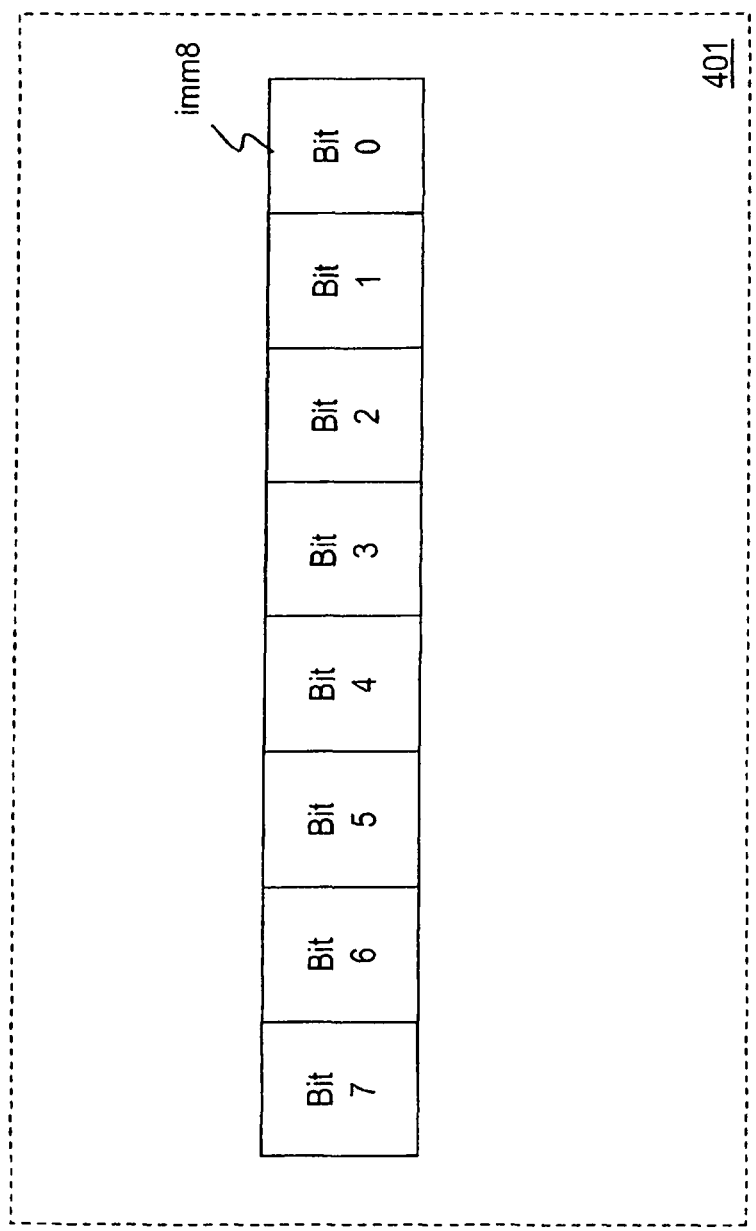
FIG. 4 illustrates an example of a field of per-lane control bits.

FIG. 4 illustrates an example of a control word, imm8, 401 to specify a field of per-lane control bits up to bits 7-0. As described above, embodiments of shuffle instruction 164 may specify a field of per-lane control bits, one or more source operands, and a destination operand, wherein the field of per-lane control bits is specified by a portion of an 8-bit immediate operand, imm8. It will be appreciated that by specifying the field of per-lane control bits as described a longer control word is not needed to handle operands where more data fields are permitted. Therefore decoding hardware may be less complex and hence faster, and the sizes of execution units may be more proportional to the number of data fields that are permitted rather than to the square of that number.

FIG. 5*a* illustrates the operation 501 of the shuffle instruction 164 in accordance with an embodiment of the invention. This embodiment includes shuffling packed data elements in an execution unit 152 responsive to the decoding, in decode unit 150, of a single shuffle instruction 164 that specifies a field of per-lane control bits 7-0, a single source operand 520 and a destination operand 529. Source operand 520 and destination operand 529 each have corresponding multi-bit lanes. For one embodiment the multi-bit lanes are all 128-bit lanes each including a similar number of (e.g. in this case four) data elements.

Responsive to the decoding of the VSHUFD shuffle instruction 164 a substantially similar set of data elements is selected from any data elements D-A by the 4:1 multiplexers 524-521 and from any data elements H-E by the 4:1 multiplexers 528-525 in each 128-bit lane of source operand 520 according to the field of per-lane control bits 7-0. Using the outputs of the 4:1 multiplexers 524-521 and the 4:1 multiplexers 528-525, data elements of the selected set are copied to any of the data fields located in corresponding 128-bit lanes of the destination operand 529 as specified according to the VSHUFD shuffle instruction 164 and the field of per-lane control bits 7-0.

Figure 5B:
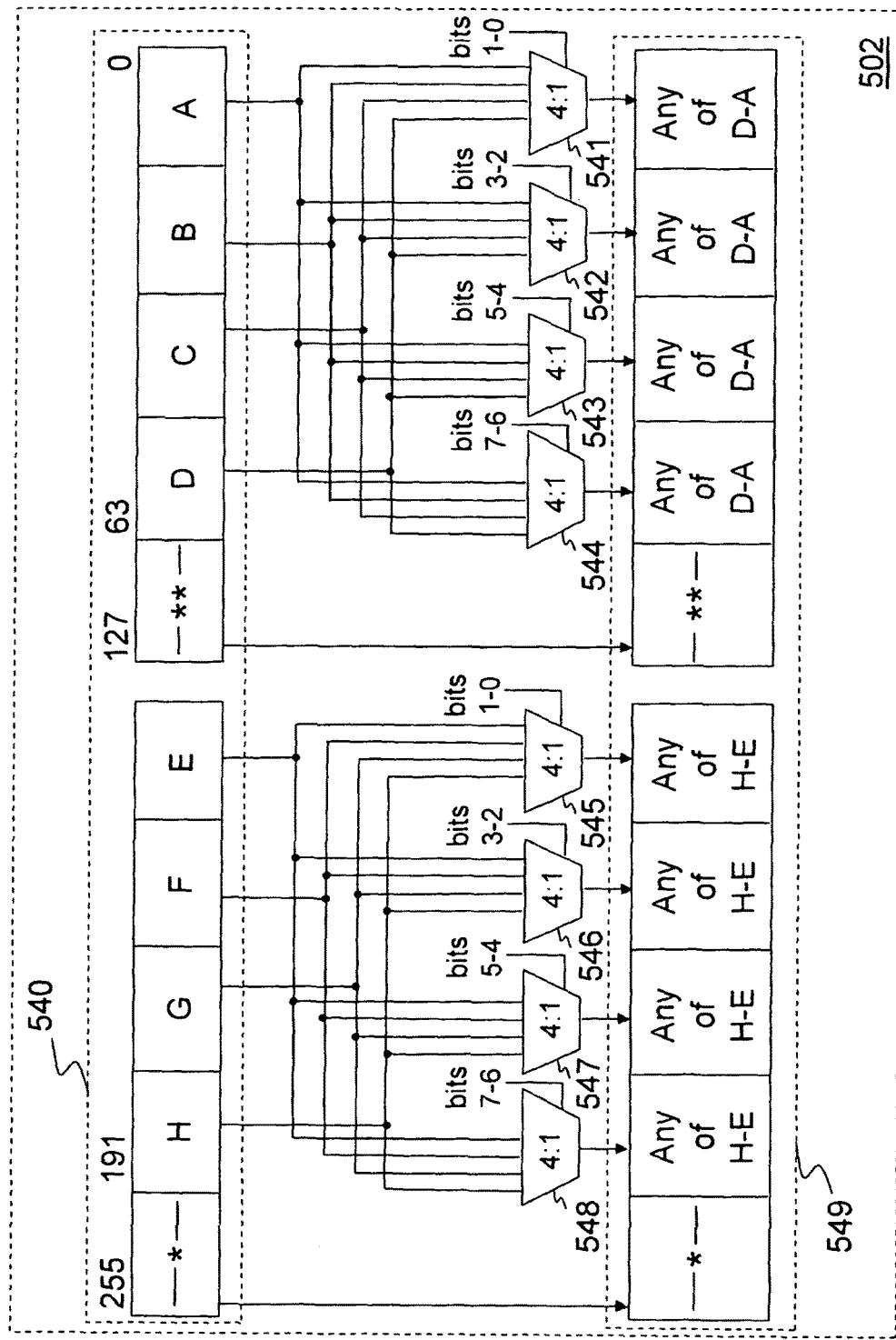

FIG. 5*b* illustrates the operation 502 of the shuffle instruction 164 in accordance with an alternative embodiment of the invention. This embodiment includes shuffling packed data elements in an execution unit 152 responsive to the decoding, in decode unit 150, of a single shuffle instruction 164 that again specifies a field of per-lane control bits 7-0, a single source operand 540 and a destination operand 549. The source operand 540 and destination operand 549 each have corresponding multi-bit lanes. For example, in this case these multi-bit lanes are each 128-bit lanes that may be further divided into upper portions (e.g. bits 255-192 and 127-64) and lower portions (e.g. bits 191-128 and 63-0), each including a similar number of (e.g. in this case four) data elements.

Responsive to the decoding of the VSHUFLW shuffle instruction 164 a substantially similar set of data elements is selected from any data elements D-A by the 4:1 multiplexers 544-541 and from any data elements H-E by the 4:1 multiplexers 548-545 in corresponding lower portions of each 128-bit lane of source operand 540 according to the field of per-lane control bits 7-0. Using the outputs of the 4:1 multiplexers 544-541 and the 4:1 multiplexers 548-545, data elements of the selected set are copied to any of the data fields located in corresponding lower portions of each 128-bit lane of the destination operand 549 as specified according to the VSHUFLW shuffle instruction 164 and the field of per-lane control bits 7-0. The higher portions of each 128-bit lane of source operand 540 (e.g. bits 255-192 and 127-64) are copied to corresponding higher portions of each 128-bit lane of destination operand 549.

Figure 5C:
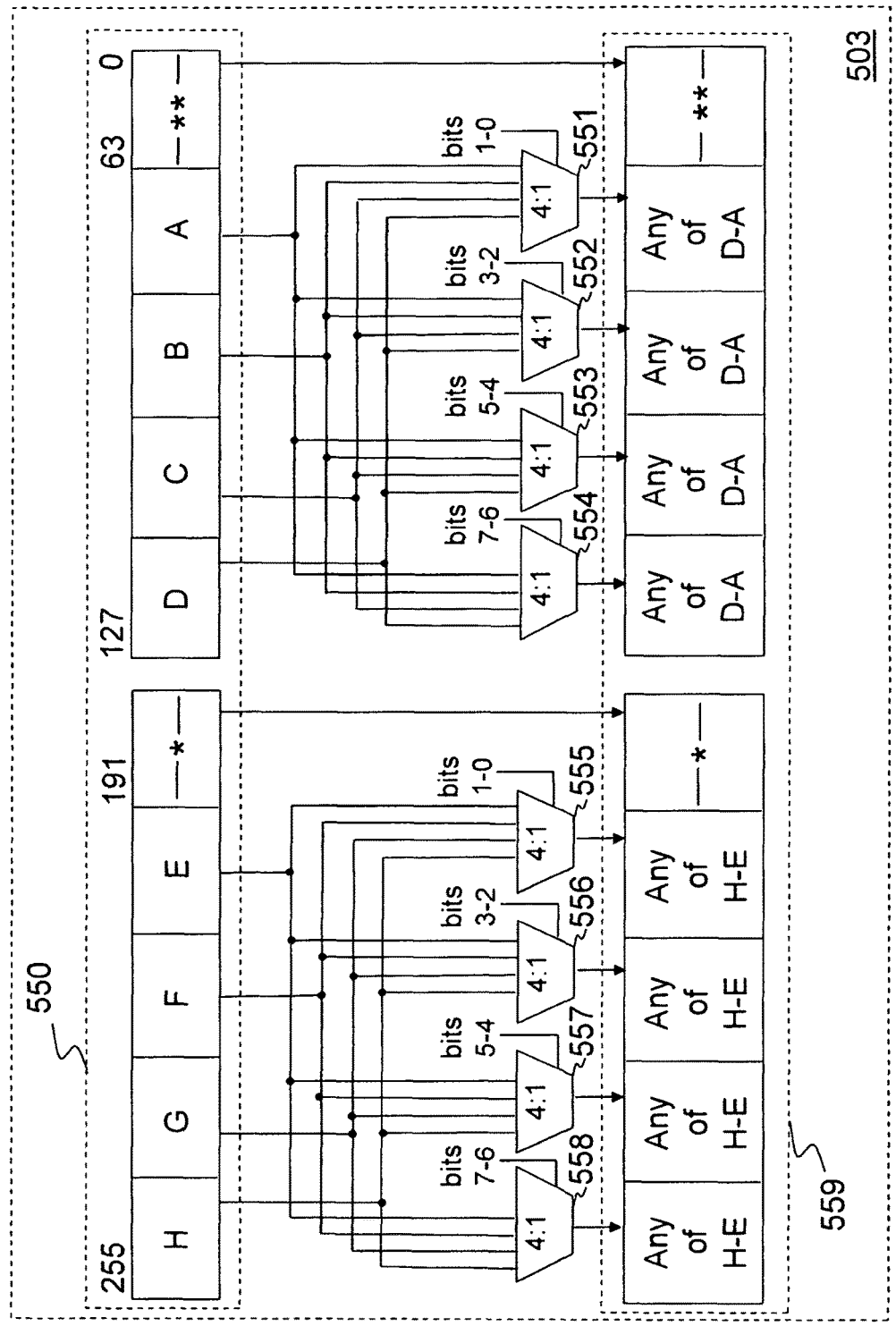

FIG. 5*c* illustrates the operation 503 of the shuffle instruction 164 in accordance with another alternative embodiment of the invention. This embodiment includes shuffling packed data elements in an execution unit 152 responsive to the decoding, in decode unit 150, of a single shuffle instruction 164 that also specifies a field of per-lane control bits 7-0, a single source operand 550 and a destination operand 559. The source operand 550 and destination operand 559 each have corresponding multi-bit lanes. For example, in this case these multi-bit lanes are each 128-bit lanes that may be further divided into upper portions (e.g. bits 255-192 and 127-64) and lower portions (e.g. bits 191-128 and 63-0), each including a similar number of (e.g. four) data elements.

Responsive to the decoding of the VSHUFHW shuffle instruction 164 a substantially similar set of data elements is selected from any data elements D-A by the 4:1 multiplexers 554-551 and from any data elements H-E by the 4:1 multiplexers 558-555 in corresponding higher portions of each 128-bit lane of source operand 550 according to the field of per-lane control bits 7-0. Using the outputs of the 4:1 multiplexers 554-551 and the 4:1 multiplexers 558-555, data elements of the selected set are copied to any of the data fields located in corresponding higher portions of each 128-bit lane of the destination operand 559 as specified according to the VSHUFHW shuffle instruction 164 and the field of per-lane control bits 7-0. The lower portions of each 128-bit lane of source operand 550 (e.g. bits 191-128 and 63-0) are copied to corresponding lower portions of each 128-bit lane of destination operand 559.

Figure 6A:
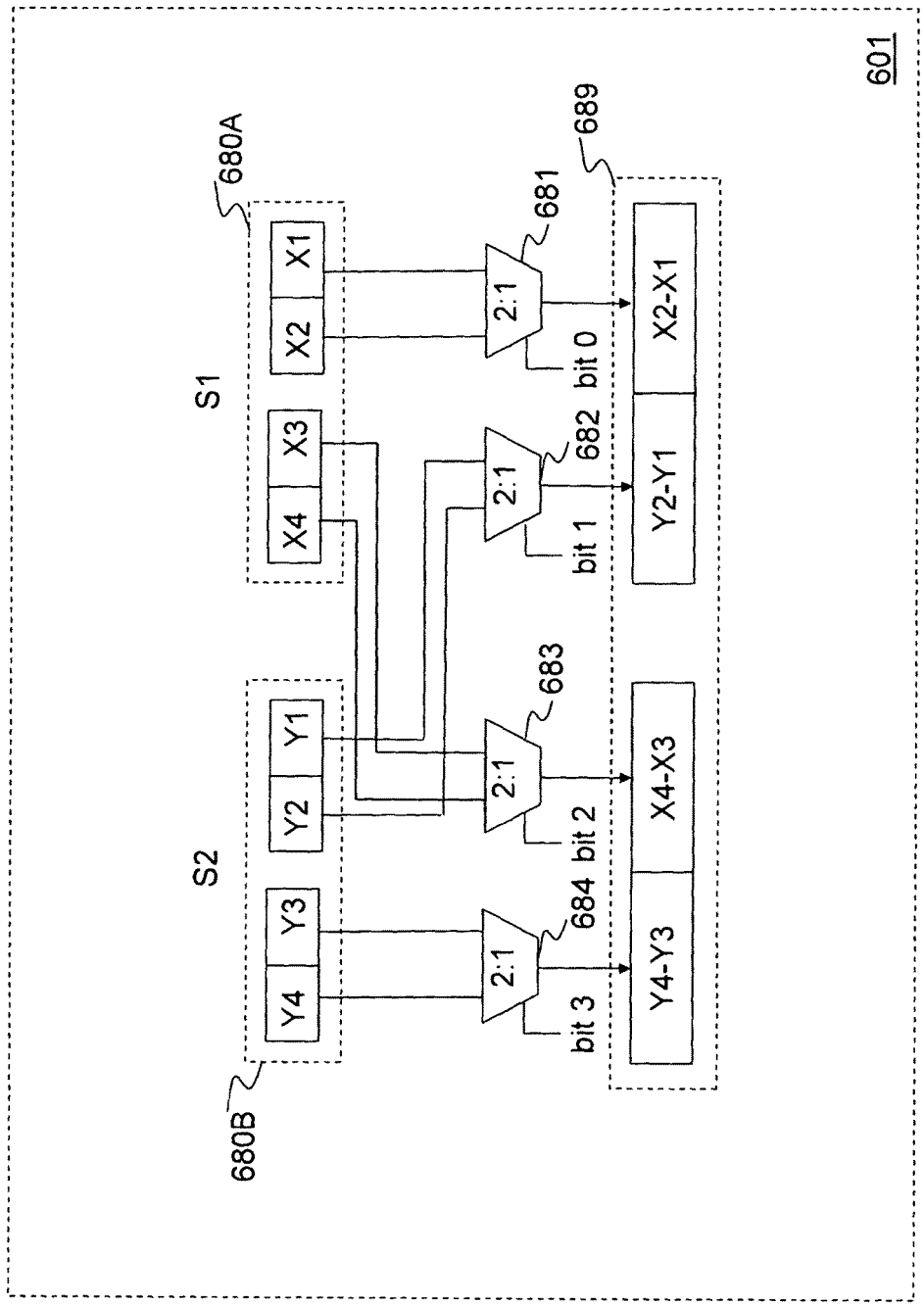
FIGS. 6a to 6b illustrate the operation of the shuffle instructions in accordance with alternative embodiments of the invention.
Figure 6B:
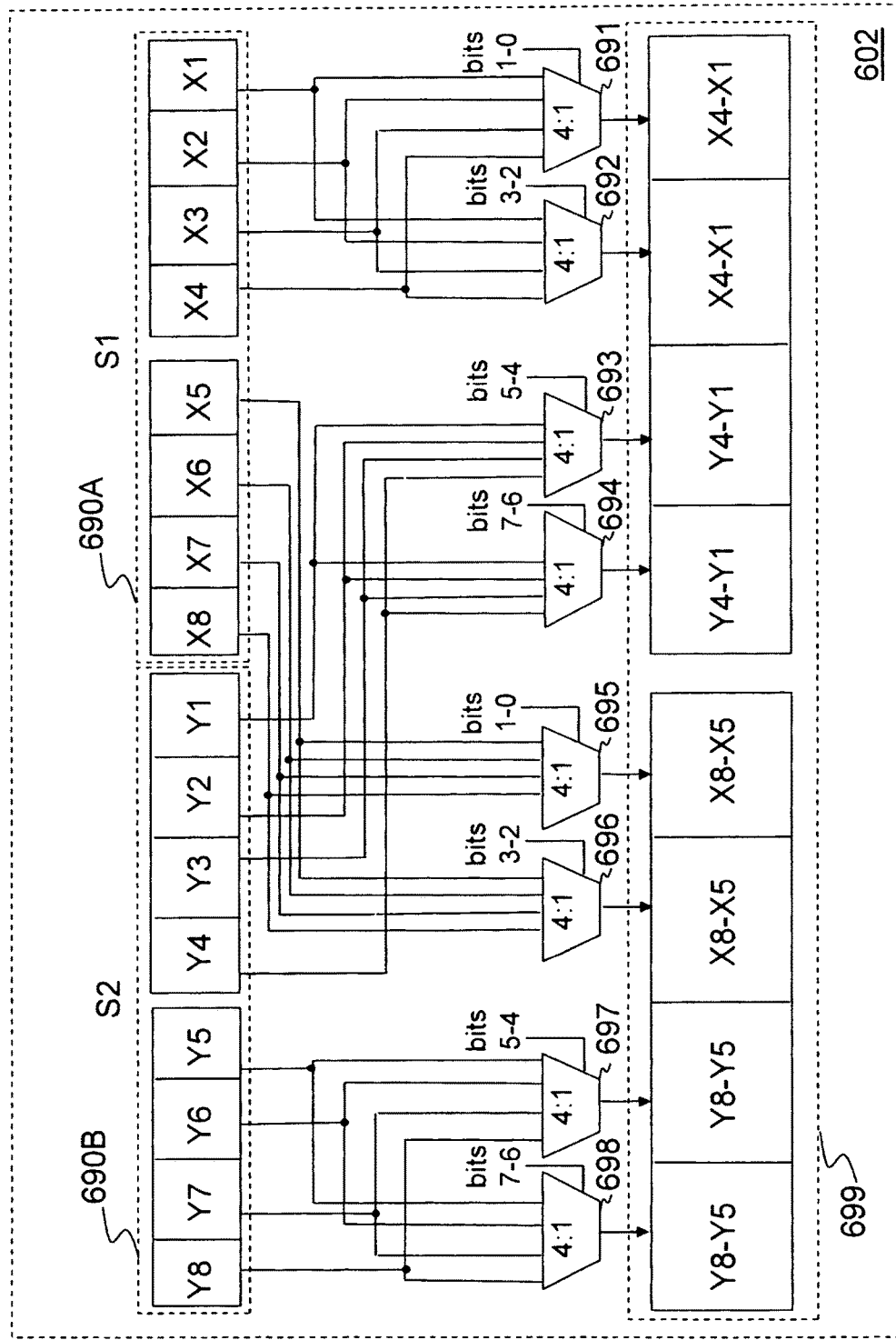

FIG. 6*a* illustrates the operation 601 of the shuffle instruction 164 in accordance with another alternative embodiment of the invention. This embodiment includes shuffling packed data elements in an execution unit 152 responsive to the decoding, in decode unit 150, of a single shuffle instruction 164 that specifies a field of per-lane control bits 3-2 and bits 1-0, a first source operand 680A, a second source operand 680B, and a destination operand 689. First source operand 680A, second source operand 680B, and destination operand 689 all have corresponding multi-bit lanes, which are 128-bit lanes in this case, each multi-bit lane includes a substantially similar number (e.g. two) of data elements.

Responsive to the decoding of the VSHUFPD shuffle instruction 164 a set of data elements can be selected including corresponding data elements (X1 or X2 and X3 or X4) from every 128-bit lane of first source operand 680A by the 2:1 multiplexers 683 and 681 and including corresponding data elements (Y1 or Y2 and Y3 or Y4) from every 128-bit lane of second source operand 680B by the 2:1 multiplexers 684 and 682 according to the field of per-lane control bits 3-2 and bits 1-0. Using the outputs of the 2:1 multiplexers 684-681 data elements of the selected set are copied to locations in corresponding 128-bit lanes of the destination operand 689 as specified according to the VSHUFPD shuffle instruction 164 and the field of per-lane control bits 3-2 and bits 1-0.

FIG. 6b illustrates the operation 602 of the shuffle instruction 164 in accordance with another alternative embodiment of the invention. This embodiment includes shuffling packed data elements in an execution unit 152 responsive to the decoding, in decode unit 150, of a single shuffle instruction 164 that specifies a single field of per-lane control bits 7-0, a first source operand 690A, a second source operand 690B, and a destination operand 699. First source operand 690A, second source operand 690B, and destination operand 699 all have corresponding multi-bit lanes, which are 128-bit lanes in this case, each multi-bit lane includes a substantially similar number (e.g. four) of data elements.

Responsive to the decoding of the VSHUFPS shuffle instruction 164 a set of data elements can be selected including corresponding data elements (X1-X4 or X5-X8) from every 128-bit lane of first source operand 690A by the 4:1 multiplexers 691-692 and 695-696 and including corresponding data elements (Y1-Y4 or Y5-Y8) from every 128-bit lane of second source operand 690B by the 4:1 multiplexers 693-694 and 697-698 according to the field of per-lane control bits 7-0. Using the outputs of the 4:1 multiplexers 698-691 data elements of the selected set are copied to locations in corresponding 128-bit lanes of the destination operand 689 as specified according to the VSHUFPS shuffle instruction 164 and the field of per-lane control bits 7-0.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A processor comprising:
a decode unit including circuitry to decode a single instruction specifying a first source operand, a second source operand, a destination operand, and an immediate operand, wherein the first source operand, the second source operand, and the destination operand each have a first lane and a second lane, wherein the first lane of the first source operand is to store data elements X4, X3, X2, and X1 (X4-X1), wherein the second lane of the first source operand is to store data elements X8, X7, X6, and X5 (X8-X5), wherein the first lane of the second source operand is to store data elements Y4, Y3, Y2, and Y1 (Y4-Y1), wherein the second lane of the second source operand is to store data elements Y8, Y7, Y6, and Y5 (Y8-Y5), and wherein the immediate operand is to specify a first plurality of control bits, a second plurality of control bits, a third plurality of control bits, and a fourth plurality of control bits; and
an execution unit coupled with the decode unit, the execution unit to perform the single instruction, the execution unit including circuitry to use the first, second, third, and fourth pluralities of control bits for each of the first and second lanes of the destination operand, the execution unit to:
copy one of the data elements X4-X1 specified by the first plurality of control bits to a first data element position of the first lane of the destination operand, copy one of the data elements X4-X1 specified by the second plurality of control bits to a second data element position of the first lane of the destination operand, copy one of the data elements Y4-Y1 specified by the third plurality of control bits to a third data element position of the first lane of the destination operand, and copy one of the data elements Y4-Y1 specified by the fourth plurality of control bits to a fourth data element position of the first lane of the destination operand; and
copy one of the data elements X8-X5 specified by the first plurality of control bits to a first data element position of the second lane of the destination operand, copy one of the data elements X8-X5 specified by the second plurality of control bits to a second data element position of the second lane of the destination operand, copy one of the data elements Y8-Y5 specified by the third plurality of control bits to a third data element position of the second lane of the destination operand, and copy one of the data elements Y8-Y5 specified by the fourth plurality of control bits to a fourth data element position of the second lane of the destination operand.

2. The processor of claim 1, wherein the first source operand is a 256-bit operand, and wherein each of the first lane of the first source operand and the second lane of the first source operand is a 128-bit lane.

3. The processor of claim 2, wherein each of the data elements X4-X1 is a 32-bit data element and each of the data elements X8-X5 is a 32-bit data element.

4. The processor of claim 1, wherein the second source operand is a 256-bit operand, and wherein each of the first lane of the second source operand and the second lane of the second source operand is a 128-bit lane.

5. The processor of claim 4, wherein each of the data elements Y4-Y1 is a 32-bit data element and each of the data elements Y8-Y5 is a 32-bit data element.

6. The processor of claim 1, wherein the immediate operand is an 8-bit operand.

7. The processor of claim 6, wherein each of the first plurality of control bits, the second plurality of control bits, the third plurality of control bits, and the fourth plurality of control bits consists of 2 bits.

8. The processor of claim 1, wherein the destination operand is a 256-bit operand, and wherein each of the first lane of the destination operand and the second lane of the destination operand is a 128-bit lane.

9. The processor of claim 1, wherein the first lane of the first source operand occupies one half of the first source operand and the second lane of the first source operand occupies another half of the first source operand.

10. A system comprising:
a plurality of processors;
a memory; and
a bus to communicatively couple a given processor of the plurality of processors to a plurality of other system components, wherein the given processor includes:
a decode unit including circuitry to decode a single instruction specifying a first source operand, a second source operand, a destination operand, and an immediate operand, wherein the first source operand, the second source operand, and the destination operand each have a first lane and a second lane, wherein the first lane of the first source operand is to store data elements X4, X3, X2, and X1 (X4-X1), wherein the second lane of the first source operand is to store data elements X8, X7, X6, and X5 (X8-X5), wherein the first lane of the second source operand is to store data elements Y4, Y3, Y2, and Y1 (Y4-Y1), wherein the second lane of the second source operand is to store data elements Y8, Y7, Y6, and Y5 (Y8-Y5), and wherein the immediate operand is to specify a first plurality of control bits, a second plurality of control bits, a third plurality of control bits, and a fourth plurality of control bits; and an execution unit coupled with the decode unit, the execution unit including circuitry to use the first, second, third, and fourth pluralities of control bits for each of the first and second lanes of the destination operand, the execution unit to:

copy one of the data elements X4-X1 specified by the first plurality of control bits to a first data element position of the first lane of the destination operand, copy one of the data elements X4-X1 specified by the second plurality of control bits to a second data element position of the first lane of the destination operand, copy one of the data elements Y4-Y1 specified by the third plurality of control bits to a third data element position of the first lane of the destination operand, and copy one of the data elements Y4-Y1 specified by the fourth plurality of control bits to a fourth data element position of the first lane of the destination operand; and copy one of the data elements X8-X5 specified by the first plurality of control bits to a first data element position of the second lane of the destination operand, copy one of the data elements X8-X5 specified by the second plurality of control bits to a second data element position of the second lane of the destination operand, copy one of the data elements Y8-Y5 specified by the third plurality of control bits to a third data element position of the second lane of the destination operand, and copy one of the data elements Y8-Y5 specified by the fourth plurality of control bits to a fourth data element position of the second lane of the destination operand.

11. The system of claim 10, wherein the first source operand is a 256-bit operand, and wherein each of the first lane of the first source operand and the second lane of the first source operand is a 128-bit lane.

12. The system of claim 11, wherein each of the data elements X4-X1 is a 32-bit data element and each of the data elements X8-X5 is a 32-bit data element.

13. The system of claim 10, wherein the second source operand is a 256-bit operand, and wherein each of the first lane of the second source operand and the second lane of the second source operand is a 128-bit lane.

14. The system of claim 13, wherein each of the data elements Y4-Y1 is a 32-bit data element and each of the data elements Y8-Y5 is a 32-bit data element.

15. The system of claim 10, wherein the immediate operand is an 8-bit operand.

16. The system of claim 15, wherein each of the first plurality of control bits, the second plurality of control bits, the third plurality of control bits, and the fourth plurality of control bits consists of 2 bits.

17. The system of claim 10, wherein the destination operand is a 256-bit operand, and wherein each of the first lane of the destination operand and the second lane of the destination operand is a 128-bit lane.

18. The system of claim 10, wherein the first lane of the first source operand occupies one half of the first source operand and the second lane of the first source operand occupies another half of the first source operand.

19. A system comprising:
a memory; and
a processor coupled with the memory, wherein the processor includes:
a decode unit including circuitry to decode a single instruction specifying a first source operand, a second source operand, a destination operand, and an immediate operand, wherein the first source operand, the second source operand, and the destination operand each have a first lane and a second lane, wherein the first lane of the first source operand is to store data elements X4, X3, X2, and X1 (X4-X1), wherein the second lane of the first source operand is to store data elements X8, X7, X6, and X5 (X8-X5), wherein the first lane of the second source operand is to store data elements Y4, Y3, Y2, and Y1 (Y4-Y1), wherein the second lane of the second source operand is to store data elements Y8, Y7, Y6, and Y5 (Y8-Y5), and wherein the immediate operand is to specify a first plurality of control bits, a second plurality of control bits, a third plurality of control bits, and a fourth plurality of control bits; and an execution unit coupled with the decode unit, the execution unit including circuitry to use the first, second, third, and fourth pluralities of control bits for each of the first and second lanes of the destination operand, the execution unit to:

copy one of the data elements X4-X1 specified by the first plurality of control bits to a first data element position of the first lane of the destination operand, copy one of the data elements X4-X1 specified by the second plurality of control bits to a second data element position of the first lane of the destination operand, copy one of the data elements Y4-Y1 specified by the third plurality of control bits to a third data element position of the first lane of the destination operand, and copy one of the data elements Y4-Y1 specified by the fourth plurality of control bits to a fourth data element position of the first lane of the destination operand; and copy one of the data elements X8-X5 specified by the first plurality of control bits to a first data element position of the second lane of the destination operand, copy one of the data elements X8-X5 specified by the second plurality of control bits to a second data element position of the second lane of the destination operand, copy one of the data elements Y8-Y5 specified by the third plurality of control bits to a third data element position of the second lane of the destination operand, and copy one of the data elements Y8-Y5 specified by the fourth plurality of control bits to a fourth data element position of the second lane of the destination operand.

20. The system of claim 19, wherein the first source operand is a 256-bit operand, and wherein each of the first lane of the first source operand and the second lane of the first source operand is a 128-bit lane.

21. The system of claim 20, wherein each of the data elements X4-X1 is a 32-bit data element and each of the data elements X8-X5 is a 32-bit data element.

22. The system of claim 19, wherein the second source operand is a 256-bit operand, and wherein each of the first lane of the second source operand and the second lane of the second source operand is a 128-bit lane.

23. The system of claim 22, wherein each of the data elements Y4-Y1 is a 32-bit data element and each of the data elements Y8-Y5 is a 32-bit data element.

24. The system of claim 19, wherein the immediate operand is an 8-bit operand.

25. The system of claim 24, wherein each of the first plurality of control bits, the second plurality of control bits, the third plurality of control bits, and the fourth plurality of control bits consists of 2 bits.

26. The system of claim 19, wherein the destination operand is a 256-bit operand, and wherein each of the first lane of the destination operand and the second lane of the destination operand is a 128-bit lane.

27. The system of claim 19, wherein the first lane of the first source operand occupies one half of the first source operand and the second lane of the first source operand occupies another half of the first source operand.

* * * * *